(12) United States Patent
Andritter et al.

(10) Patent No.: US 7,246,674 B2
(45) Date of Patent: Jul. 24, 2007

(54) ASSEMBLY SUPPORT OF A FRONT END OF A MOTOR VEHICLE AND METHOD FOR DETACHABLY FIXING A COOLING MODULE TO AN ASSEMBLY SUPPORT OF A FRONT END

(75) Inventors: Dirk Andritter, Ingersheim (DE); Stefan Schmidgall, Stuttgart (DE); Hans Schlingmann, Horn-Bad Meinberg (DE); Ralf Schmidt, Oelde (DE); Reinhold Brückner, Herzebrock-Clarholz (DE); Dirk Kersting, Lippstadt (DE); Andreas Fischer, Lippstadt-Esbeck (DE); Martin Gehring, Winterbach (DE); Horst Winkelmann, Grafenau (DE)

(73) Assignees: Behr GmbH & Co. KG, Stuttgart (DE); Hella-Behr Fahrzeugsysteme GmbH, Lippstadt (DE)

( * ) Notice: Subject to any disclaimer, the term of this patent is extended or adjusted under 35 U.S.C. 154(b) by 293 days.

(21) Appl. No.: 10/504,991

(22) PCT Filed: Feb. 18, 2003

(86) PCT No.: PCT/EP03/01603

§ 371 (c)(1),
(2), (4) Date: Nov. 17, 2004

(87) PCT Pub. No.: WO03/070503

PCT Pub. Date: Aug. 28, 2003

(65) Prior Publication Data

US 2005/0062315 A1 Mar. 24, 2005

(30) Foreign Application Priority Data

Feb. 20, 2002 (DE) ............... 102 07 025

(51) Int. Cl.
*B60K 11/04* (2006.01)
(52) U.S. Cl. .................. 180/68.4
(58) Field of Classification Search ........... 180/68.4, 180/68.6, 68.5, 271, 274; 296/187.09, 187.04
See application file for complete search history.

(56) References Cited

U.S. PATENT DOCUMENTS 4,541,645 A * 9/1985 Foeldesi ............ 180/68.4
5,067,574 A 11/1991 Attinger et al.
5,348,114 A 9/1994 Yamauchi
5,409,288 A 4/1995 Masuda (Continued)

FOREIGN PATENT DOCUMENTS

DE 26 34 990 A1 2/1978

(Continued)

*Primary Examiner*—J. Allen Shriver
(74) *Attorney, Agent, or Firm*—Foley & Lardner LLP (57) ABSTRACT

A assembly support (33) of a front end of a motor vehicle is proposed, having at least one cooling module (1) which is detachably fixed to the assembly support (33) by means of at least two connecting points (9, 15; 11, 13). The assembly support (33) is characterized in that one of the connecting points (9; 11) is embodied as a pivot bearing (17; 19), and in that the other of the connecting points (13; 15) is embodied as a clip connection (21; 23).

In addition, a method for detachably fixing a cooling module (1) to a assembly support (33) of a front end of a motor vehicle is proposed.

37 Claims, 4 Drawing Sheets

U.S. PATENT DOCUMENTS

| | | | |
|---|---|---|---|
| 5,658,041 A | 8/1997 | Girardot et al. | |
| 6,158,500 A * | 12/2000 | Heine | 165/67 |
| 6,260,609 B1 * | 7/2001 | Takahashi | 165/69 |
| 6,273,182 B1 * | 8/2001 | Pautler et al. | 165/67 |
| 6,318,450 B1 * | 11/2001 | Acre | 165/67 |
| 6,364,403 B1 * | 4/2002 | Ozawa et al. | 296/187.09 |
| 6,386,497 B1 | 5/2002 | Guyomard et al. | |
| 6,412,581 B2 * | 7/2002 | Enomoto et al. | 180/68.4 |
| 7,036,561 B2 * | 5/2006 | Yagi et al. | 165/67 |
| 7,036,617 B2 * | 5/2006 | Harada | 180/68.4 |
| 7,044,203 B2 * | 5/2006 | Yagi et al. | 165/122 |
| 7,044,246 B2 * | 5/2006 | Fujieda | 180/68.4 |
| 2001/0001994 A1 * | 5/2001 | Enomoto et al. | 180/68.4 |
| 2003/0146030 A1 * | 8/2003 | Harada | 180/68.4 |
| 2004/0188155 A1 * | 9/2004 | Fujieda | 180/68.4 |
| 2006/0207815 A1 * | 9/2006 | Vandekerkhof | 180/68.4 |
| 2006/0213639 A1 * | 9/2006 | Kobayashi et al. | 165/67 |

FOREIGN PATENT DOCUMENTS

| | | |
|---|---|---|
| DE | 32 46 583 C1 | 4/1984 |
| DE | 41 37 038 C1 | 6/1993 |
| DE | 41 42 023 A1 | 6/1993 |
| DE | 44 01 643 C2 | 8/1994 |
| DE | 694 02 396 T2 | 5/1995 |
| DE | 198 27 451 A1 | 1/1999 |
| DE | 198 50 590 A1 | 5/2000 |
| DE | 100 08 638 A1 | 9/2000 |
| DE | 100 51 567 A1 | 4/2001 |
| EP | 0 437 780 B2 | 8/1998 |
| EP | 1 067 005 B1 | 8/2003 |
| FR | 2 564 899 A1 | 11/1985 |
| GB | 2 262 600 A | 6/1993 |
| JP | 8-310258 A | 11/1996 |
| JP | 10-205328 A | 8/1998 |
| JP | 10-252473 A | 9/1998 |
| JP | 11-011348 A | 1/1999 |
| WO | WO 97/15467 A1 | 5/1997 |

* cited by examiner

ASSEMBLY SUPPORT OF A FRONT END OF A MOTOR VEHICLE AND METHOD FOR DETACHABLY FIXING A COOLING MODULE TO AN ASSEMBLY SUPPORT OF A FRONT END

BACKGROUND OF THE INVENTION

The invention relates to an assembly support of a front end of a motor vehicle, having at least one cooling module which is detachably fixed to the assembly support by means of at least two connecting points, and a method for detachably fixing a cooling module to an assembly support of a front end of a motor vehicle.

DE 198 27 451 A1 discloses an assembly support of the type referred to here, and a method for mounting a radiator on the assembly support. The assembly support is a supporting structure of a front end of the motor vehicle to which at least the radiator can be detachably fixed. For this purpose, securing parts which are enclosed by an elastic material are provided on the radiator, said parts being plugged into grooves on the assembly support in order to attach the radiator. The grooves each have a first groove section which extends in the direction of the forward movement of the vehicle, and a second groove section which extends downward from the rear end of the first groove section, and a third groove section which extends from the lower end of the second groove section in the longitudinal direction of the vehicle. In order to attach the radiator, the securing parts are first introduced into the first groove section and pushed as far as the second groove section. In the process, the elastic covering is compressed to such an extent that the securing parts can be displaced downward as far as the third groove section. As a result of the opposing forces of the deformed elastic covering, the securing parts are as if they were pressed into the third groove section and secured therein. The radiator is secured to the assembly support exclusively by the securing parts which engage in the grooves, that is to say it is possible to dispense with additional attachment means or connecting means. It has been found that when the radiator is attached it is necessary to apply relatively large forces, in particular in order to compress the elastic covering of the securing parts. At the same time the radiator must be guided precisely, so that the securing parts do not tilt in the grooves.

SUMMARY OF THE INVENTION

An object of the invention is to provide an assembly support of the type mentioned at the beginning to which a cooling module can easily be attached, preferably by applying only relatively small forces. A further object of the invention is to specify a method of the type mentioned at the beginning which permits the cooling module to be attached to the assembly support easily.

In order to achieve the object, an assembly support is proposed. At least one cooling module is detachably fixed to the assembly support by means of at least two connecting points. The assembly support is characterized in that one of the connecting points is embodied as a pivot bearing, and in that the other of the connecting points is embodied as a clip connection. For this purpose, in order to attach the cooling module to the assembly support, the cooling module must merely be pivoted in the pivot bearing into an end position in which the cooling module is clipped to the assembly support. As a result, the cooling module can be attached to the assembly support quickly and easily without using tools.

In a preferred embodiment there is provision for the cooling module to be attached to the assembly support without screws, that is to say no additional attachment means such as, for example, screws are required in order to ensure the secure connection of the cooling module to the assembly support.

In addition, in order to achieve the object, a method is proposed. Said method provides for the detachable attachment of a cooling module to an assembly support of a front end of a motor vehicle, in that, in a first assembly step, the cooling module is inserted into a pivot bearing by means of an insertion movement and in that, in a second assembly step, the cooling module is pivoted, by means of a pivoting movement in the pivot bearing, into an end position in which the cooling module is clipped to the assembly support. The cooling module is therefore initially displaced in a translatory fashion in order to insert it into the pivot bearing. Then, the cooling module is moved, by the rotational movement in the pivot bearing, into the desired mounting position with respect to the assembly support or motor vehicle and secured to the assembly support by automatic engagement of the at least one clip connection.

In a preferred embodiment of the method there is provision for the insertion movement of the cooling module into the pivot bearing to occur essentially transversely with respect to the direction of travel of the vehicle. That is to say the cooling module is inserted into the pivot bearing aligned with the perpendicular to the cooling face in the direction of travel or essentially in the direction of travel, either in the direction of the pivot axis of the pivot bearing, for example when there is a closed bearing shell, or radially or essentially radially with respect to the pivot axis, preferably from the top obliquely toward the bottom, when there is a bearing shell which has a plug-in opening on its outer circumference at least during the attachment of the cooling module to the assembly support.

BRIEF DESCRIPTION OF THE DRAWINGS

The invention is explained in more detail below with reference to the drawing, in which.

DETAILED DESCRIPTION OF THE INVENTION

Figure 1:
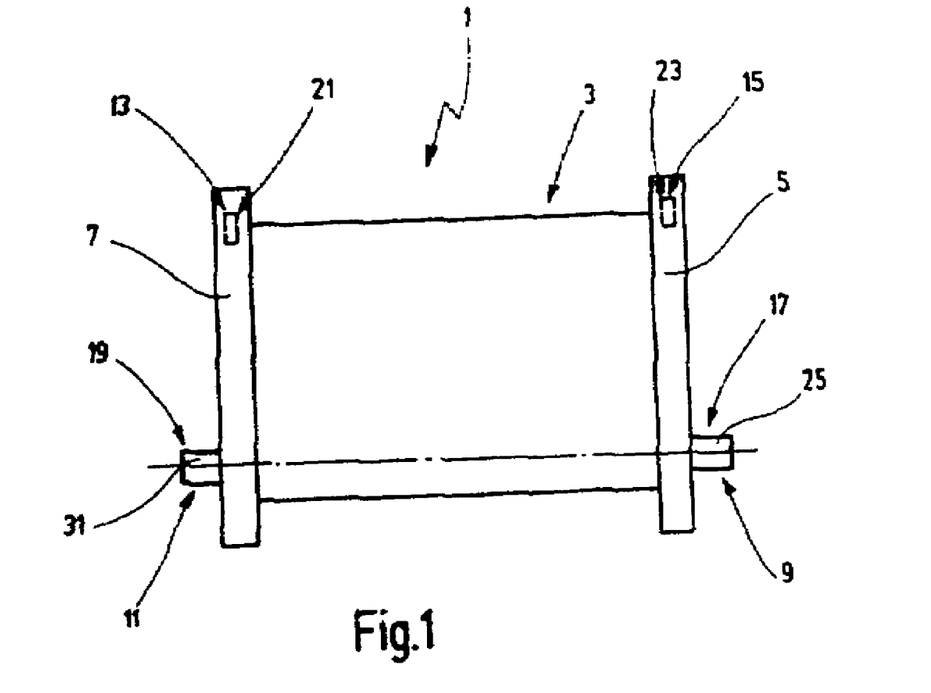
FIG. 1 shows a basic outline of an exemplary embodiment of a cooling module.

FIG. 1 shows, in a schematic view, an exemplary embodiment of a cooling module 1 which can be detachably fixed to an assembly support (not illustrated) of a front end of a motor vehicle. The cooling module 1 has a radiator 3 which comprises side boxes 5 and 7, in particular water boxes (laterally oriented coolant tanks), which are arranged at a distance from one another and extend in parallel with one another. Said boxes are connected to one another by means of tubes (not illustrated) through which the medium to be cooled flows. The radiator 3 also has at least one coolant inflow and outflow for connection to a coolant circuit, these not being illustrated in FIG. 1. The design and the function of the radiator 3 are generally known so that they will not be explained in more detail here. As an alternative to, or in addition to, the radiator 3, the cooling module 1 can also have at least one further radiator and/or condenser or the like, which can be arranged next to one another, on top of one another and/or behind one another.

The cooling module 1 which is illustrated in FIG. 1 can be detachably fixed, by means of four connecting points 9, 11, 13 and 15, to the assembly support, of which the first and second connecting points 9, 11 are embodied as pivot bearings 17, 19, and the third and fourth connecting points 13, 15 are embodied as clip connections 21, 23. The pivot bearing 17 and the clip connection 23, or parts thereof, are provided on the side box 5, and the pivot bearing 19 and the clip connection 21, or parts thereof, are provided on the other water box 7.

Figure 2:
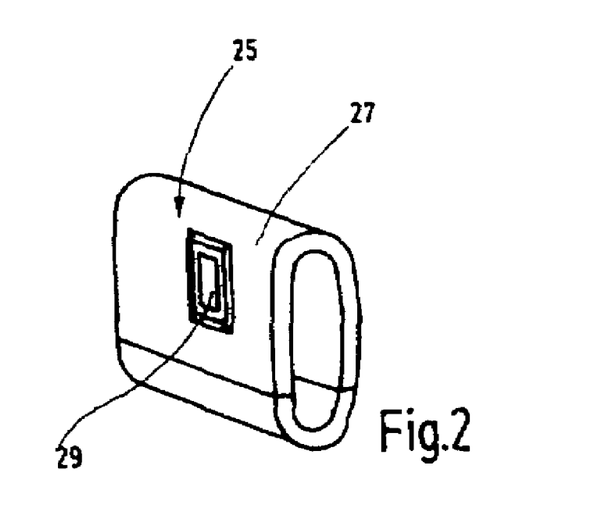
FIG. 2 shows a perspective illustration of a bearing pin which is provided on the cooling module according to FIG. 1.

The pivot bearing 17 comprises a bearing pin 25 which is illustrated in FIG. 2 on an enlarged scale. The bearing pin 25 is of tubular construction and has an oval cross section. It has, on its outer circumferential face 27, a projection 29 which is essentially in the shape of a truncated pyramid here. More details on the function of the projection 29 will be given below.

As is apparent from FIG. 1, the other pivot bearing 19 also comprises a bearing pin 31 which differs from the pivot pin 25 described with respect to FIG. 2 only in that it does not have a projection on its outer circumferential face. In addition, FIG. 1 shows that the bearing pins 25, 31 are arranged flush with one another, that is to say their longitudinal center axes or their pivot axes are located in an aligned arrangement with respect to one another. The bearing pins 25, 31 do not necessarily need to be arranged at the same level, that is to say they can also be located at a distance from one another, viewed over the level of the cooling module 1. It is important that their pivot axes run in parallel with one another.

The bearing pins 25, 31 are preferably composed of plastic or at least covered in plastic and integrally connected to the respective side box 5, 7. In a preferred embodiment there is provision for the bearing pins 25, 31 to be attached, by encapsulation by injection molding, to the side boxes 5, 7 which are also composed of plastic or comprise plastic.

FIG. 1 shows that the bearings 25, 31 project laterally from the side edge regions of the radiator 3 or of the side boxes 5, 7, while the clip connections 21, 23 are arranged on that side of the side boxes 5, 7 which faces the assembly support. It is also to be noted that, in the attached state of the cooling module 1 to the assembly support, the clip connections 21, 23 are located above the pivot bearings 17, 19, viewed in the direction of the action of gravity. The view according to FIG. 1 therefore shows a possible attachment position of the cooling module 1 on the assembly support.

Figure 3A:
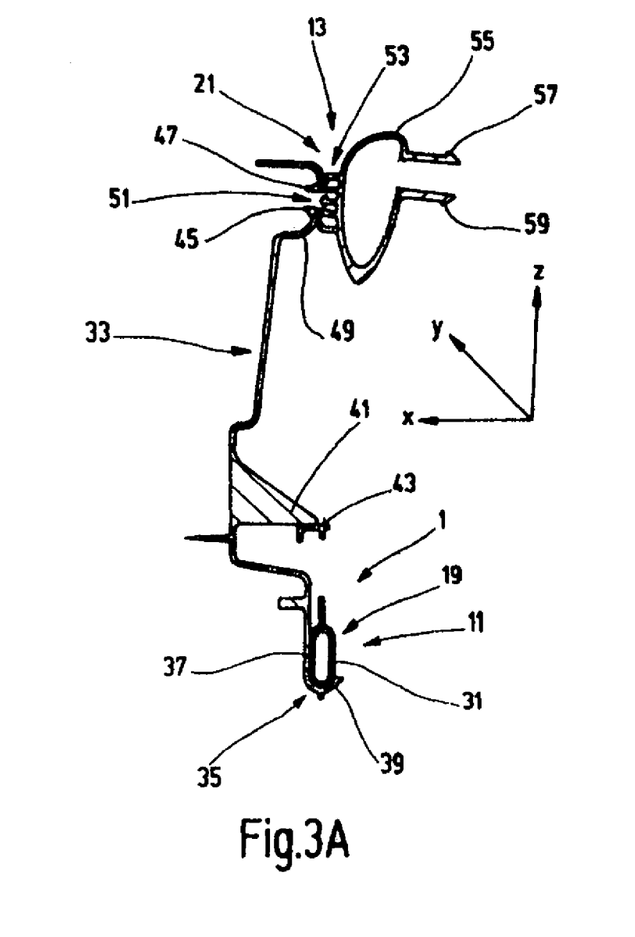
FIGS. 3A and 3B each show a detail of an assembly support and of a cooling module attached thereto.

FIG. 3A shows a detail of an assembly support 33 of a front end of a motor vehicle to which a cooling module 1, as has been described with reference to FIGS. 1 and 2, is detachably fixed. It is also possible to see only a detail of the cooling module 1, specifically in the region of the second connecting point 11. The section view which is illustrated in FIG. 3A therefore extends through a side edge region of the cooling module 1 in the region of the side box 7 and of the pivot bearing 19.

The pivot bearing 19 comprises a bearing shell 35 which is integrally connected to the assembly support 33. The assembly support 33 is preferably of hybrid design and is composed of at least two materials, preferably of a plastic-covered sheet metal or metal core. The bearing shell 35 is preferably composed of plastic and is attached to the assembly support 33 by encapsulation by injection molding. The bearing shell 35 is composed of a vertically extending straight wall section 37 and a bent second wall section 39 which adjoins its end and is open in the upward direction. The second wall section 39 has a curvature which is adapted to the external contour of the bearing pin 31 so that, when the cooling module 1 is mounted on the assembly support 33, as illustrated in FIG. 3A, the oval bearing pin 31 bears in a planar fashion in the region of the second wall section 39 of the bearing shell 35. In addition, the flat wall region of the bearing pin 31 which faces the first wall section 37 bears in a planar fashion against the first wall section 37. It becomes readily apparent that the second wall section 39 engages around the lower edge region of the bearing pin 31 so that the bearing pin 31 is securely held in the bearing shell 35. By virtue of the fact that the bearing shell 35 is not completely closed but rather open in the upward direction, the cooling module 1 can be introduced into the pivot bearing 19 by means of a translatory movement which occurs perpendicularly or in the perpendicular direction with respect to the pivot axis of the pivot bearing 19 which extends perpendicularly with respect to the plane of the image in FIG. 3A.

The pivot bearing 19 which is described with reference to FIG. 3A is embodied as a movable bearing, that is to say it permits tolerance and length compensation of the cooling module 1 in the direction of its pivot axis, that is to say in the direction of the coordinate axis y, while the positive engagement between the bearing shell 35 and bearing pin 31 prevents the cooling module 1 moving in the direction of the coordinate axis x. Owing to the refinement of the pivot bearing 19 which is described above, thermally induced expansion and fabrication tolerances of the cooling module 1 can readily be absorbed.

In order to prevent the cooling module 1 from being displaced in the direction of the coordinate axis z, that is to say in the vertical direction in the view according to FIG. 3A, in the state in which it is attached to the assembly support 33, a radial movement limiter stop 41 is provided on the assembly support 33, said stop 41 being attached to the assembly support 33 by encapsulation by injection molding, that is to say being integrally connected thereto. A corresponding face 43 is provided on the cooling module 1 and, in the end position, or mounting position of the cooling module 1 which is shown in FIG. 3A, is moved into a position opposite the radial movement limiter stop 41. The stop 41 also ensures that virtually no forces act on the clip connections 21, 23 in the direction of the coordinate axis z, apart from, if appropriate, the forces caused by thermally induced expansions of the cooling module 1.

The clip connection 21 which is arranged above the pivot bearing 19 has securing elements 45 and 47 which can be deflected automatically in a resilient fashion and, as shown in FIG. 3A, assume, in the attachment position, a position in which they engage behind a corresponding element 49, which is provided here on the assembly support 33. The securing elements 45, 47 engage in a hole 51 which is provided on the assembly support 33, and each rest with a projection-shaped engagement section on a region of the edge of the hole 51, as a result of which the engagement position is formed and the cooling module 1 is reliably secured to the assembly support 33.

The clip connection 21 also has a deflection limiter 53 which is intended to prevent inadmissible overextension of the securing elements 45, 47. The deflection limiter 53 is formed here by three webs, a first web of which is located in the intermediate space between the securing elements 45, 47, and the two other webs of which are located on the side of the securing elements 45, 47 which is opposite the first web.

The securing elements 45, 47 and the deflection limiter 53 are located on a clip carrier 55, which has further securing elements 57 and 59 which can be deflected automatically in a resilient fashion and which are parts of a further clip connection for clipping the clip carrier 55 to the cooling module 1. The clip carrier 55 is preferably composed of plastic and is preferably manufactured using an injection molding method.

The clip connection 21 which is described with reference to FIG. 3A can readily also be embodied in such a way that the securing elements 45, 47 are integrally connected to the cooling module 1, preferably to the water box 7. As a result, it is possible to dispense with the clip carrier 55 as a separate part. The clip carrier 55 has, in contrast, the advantage that it can easily be replaced so that, when securing elements 45, 47 are damaged, they can readily be exchanged. Of course, the securing elements 45, 47 of the clip connection 21 can also be arranged on the assembly support 33 or attached to it by encapsulation by injection molding. It is also conceivable for the clip carrier 55 to be clipped to the assembly support 33 by means of the securing elements 57, 59 so that the securing elements 45, 47 assume, in the attachment position, a position in which they engage behind a corresponding element which is arranged on the cooling module 1.

In FIG. 3A, the assembly support 33 is represented, with the cooling module 1 which is detachably fixed therein, in an installation position in the motor vehicle, the direction of travel of the vehicle extending in the direction of the x coordinate axis, and the action of gravity extending in, or essentially in the direction of the z coordinate axis. This arrangement ensures that the weight of the cooling module 1 is reliably supported or secured by the pivot bearings 17, 19. The clip connections 21, 23 are therefore not loaded by the weight of the cooling module 1 so that it is possible to ensure that it is reliably secured.

The connecting point 13 which is formed by the clip connection 21 is embodied as a movable bearing, that is to say it permits the cooling module 1 to expand longitudinally in the direction of the y coordinate axis, that is to say in the direction of the pivot axis of the pivot bearing 19. For this purpose, the hole 51 has such a large width that the securing elements 45, 47 which engage therein have lateral play, viewed in the direction of the insertion movement. In the direction of the x coordinate axis, the cooling module 1 is secured in the region of the connecting point 13, the securement being carried out in the direction of the z coordinate axis by means of the radial movement limiter stop 41. Since the corresponding face 43 on the cooling module 1 bears in a planar fashion against the radial movement limiter stop 41 in its region in which it overlaps with said stop 41, viewed in the z direction, the corresponding face 43 can slide along the radial movement limiter stop 41 when there is a change in length of the cooling module 1. The radial movement limiter stop 41 therefore secures the cooling module 1 only in the z direction, while it permits movements in the x direction and in the y direction.

Figure 3B:
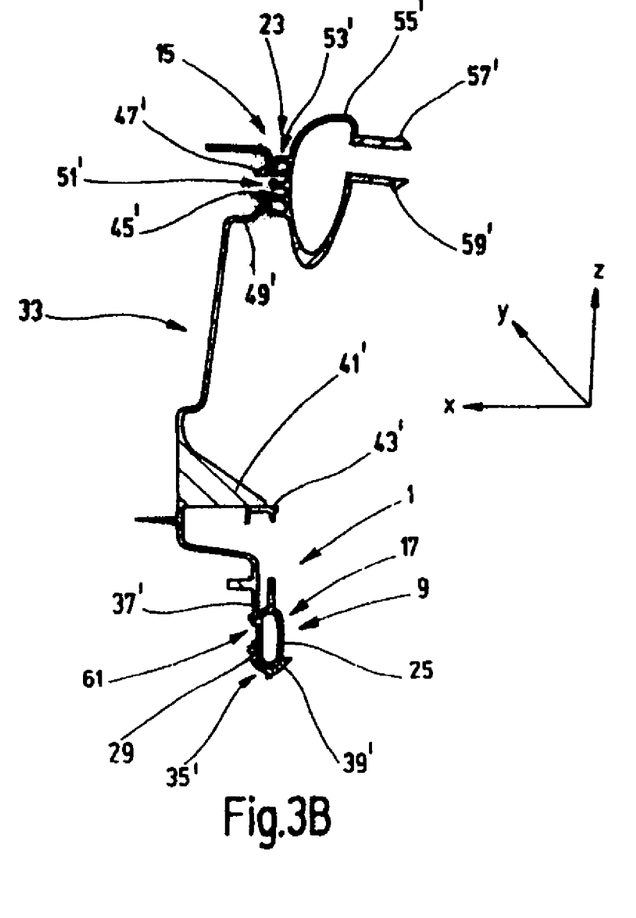

FIG. 3B shows a detail of the assembly support 33 and of the cooling module 1 attached thereto, in the region of the other side edge region of the cooling module 1 on which the bearing pin 25 of the first pivot bearing 17 is located (cf. FIG. 1). Identical parts are provided with identical reference symbols which are provided with a prime symbol ("'") so that in this respect reference is made to the description relating to the preceding figures.

The first pivot bearing 17 which is arranged on the side edge region of the cooling module 1 lying opposite the second pivot bearing 19 also has a bearing shell 35' into which the bearing pin 25 is inserted, the lower, curved circumferential region of the bearing pin 25 bearing in a planar fashion in the curved wall section 39' and said wall section 39' engaging partially around said region, and the one flat side of the bearing pin 25 bearing for the most part in a planar fashion against the first wall section 37'. The projection 29 which is described with reference to FIG. 2 and protrudes from the outer circumferential face 27 of the bearing pin 25 engages, in the attachment position of the cooling module 1, in a hole 61 in the assembly support 33 in a positively engaging fashion, as a result of which the cooling module 1, in the region of the connecting point 9, is secured against displacement both in the direction of the x coordinate axis and also in the direction of the y coordinate axis. The shape of the hole 61 is preferably adapted to the outer contour of the projection 29, that is to say, in this exemplary embodiment, the hole 61 is therefore of approximately rectangular shape. In the z direction, the cooling module 1 is also secured on this side by means of a radial movement limiter stop 41' against which the corresponding face 43 which is connected to the cooling module 1, or formed thereon, bears.

The shape and the size of the hole 61 is therefore selected in such a way that the width of the hole 61, viewed in the direction of the insertion movement of the projection 29 into the hole 61, is approximately of the same size as, and preferably only slightly larger than the width of the projection 29. The same also applies to the height of the hole 61 in comparison to the height of the projection 29, as is apparent in FIG. 3B. A displacement of the cooling module 1 in the z direction is therefore also prevented by the projection 29 which engages in the hole 61. Given corresponding dimensioning of the projection 29 and of the hole 61, it would also be possible to dispense with the radial movement limiter stop 41', if appropriate.

The connecting point 15 which is embodied as a clip connection 23 and which is located above the pivot bearing 17, approximately at the same height as the clip connection 21 on the opposite side of the cooling module 1 here, is of identical design to the clip connection 21 described in FIG. 3A so that a further description will not be given. The embodiment variants of the clip connection 21 which are described with reference thereto apply readily also to the clip connection 23. In addition to the pivot bearing 19 and the clip connection 21, the clip connection 23 is therefore also embodied as a movable bearing. Only the pivot bearing 17 is therefore a fixed bearing.

The assembly steps for detachably fixing the cooling module 1 described with reference to FIGS. 3A and 3B to the assembly support 33 take place in the same way as in the exemplary embodiment of the cooling module 1 illustrated in FIGS. 4A to 4C, so that reference is made to the following description with respect to the mounting of the cooling module 1.

Figure 4A:
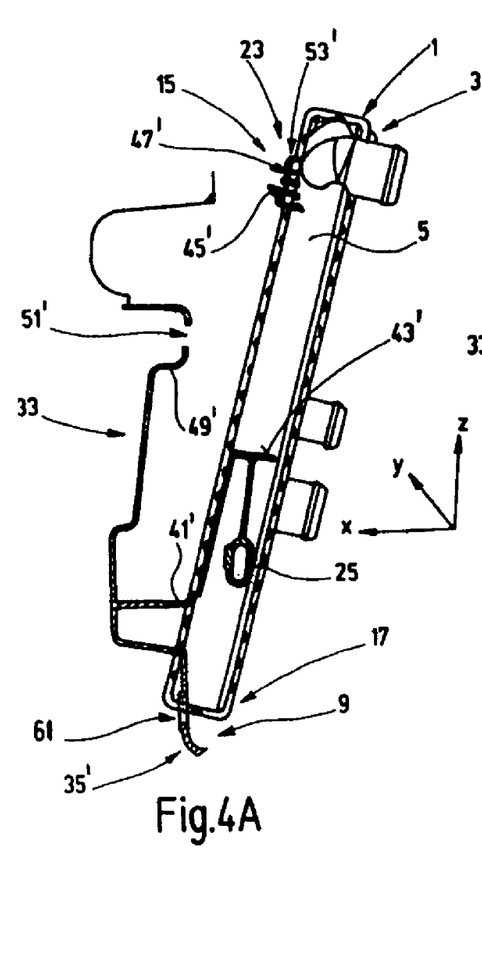
FIGS. 4A to 4C each show a view of a further exemplary embodiment of the cooling module in various positions during the process of attachment to the assembly support.
Figure 4B:
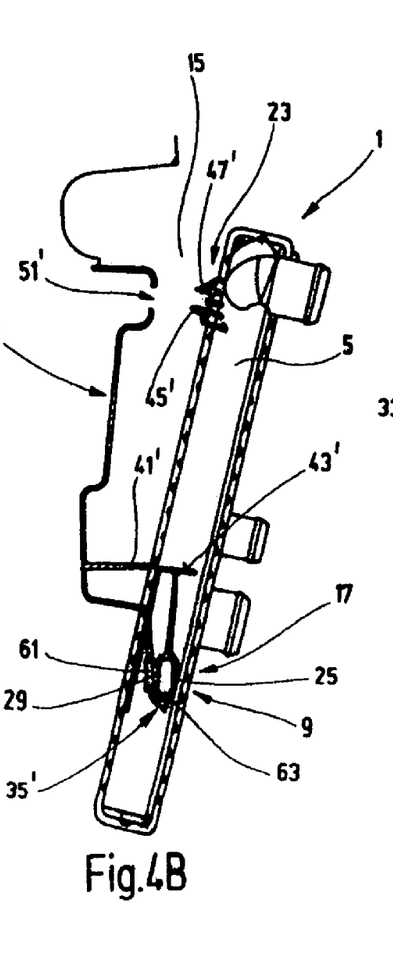
Figure 4C:
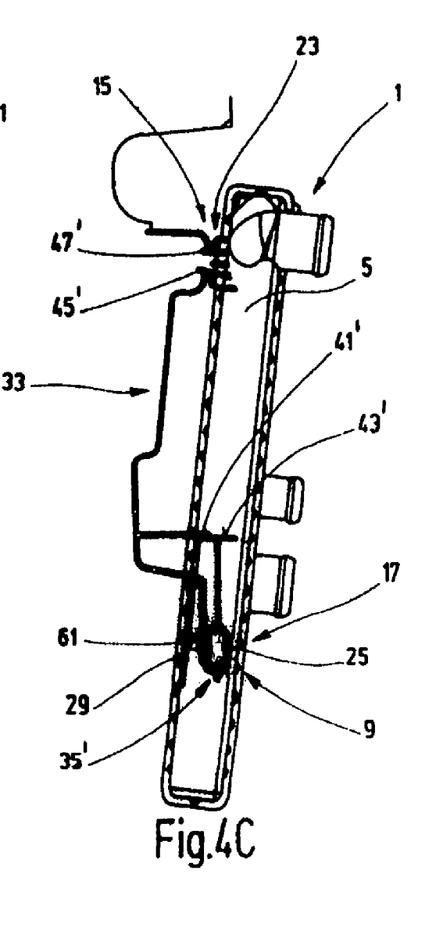

The cooling module 1 which is represented in FIG. 4 has, in this exemplary embodiment, a total of four connecting points, such as are described with reference to FIGS. 1 to 3B, only the connecting point 9 (pivot bearing, fixed bearing)

and the connecting point 15 (clip connection, movable bearing) which is located above it being shown. The clip connections 21 and 23 which form the connecting points 13 and 15 differ from the clip connections described above only in that the securing elements 45, 47, 45' and 47' and the deflection limiters 53, 53' are attached to the cooling module 1 or to the respective side boxes 7, 5 by encapsulation by injection molding.

In FIG. 4A, the cooling module 1 is shown during a first assembly step in which it is inserted from above into the pivot bearing 17, 19 by means of a translatory insertion movement. It is apparent that the cooling module 1 is inclined during the insertion movement with respect to an imaginary vertical line which extends in parallel with the z coordinate axis, the angle of inclination being preferably less than 45° and being approximately 10° here. In this inclined position, the cooling module 1 is therefore inserted into the pivot bearing 17, 19.

FIG. 4B illustrates the cooling module 1 after the first assembly step has been terminated. The bearing pins 25, 31 are then located in the bearing shells 35, 35'. The entire weight of the cooling module 1 is then supported already by the assembly support 33. From FIG. 4B it is apparent that the cooling module 1 has to be inclined during the first assembly step with respect to the vertical in particular because the corresponding faces 43 and 43' are still arranged in front of the respectively assigned radial movement limiter stop 41 or 41' and in addition the projection 29 on the bearing pin 25 is still located in front of the hole 61, as illustrated in FIG. 4B.

In a second assembly step, the cooling module 1 is then pivoted essentially in the direction of travel of the vehicle, that is to say in the direction of the x coordinate axis, in the pivot bearings 17, 19, by means of a pivoting movement about the pivot axis 63, into an end position in which the cooling module 1 is clipped to the assembly support 33. This end position is represented in FIG. 4C. As a result of the pivoting, the corresponding faces 43 and 43' have moved into a position opposite the radial movement limiter stops 41, 41' so that the cooling module 1 is secured against movement in the vertical direction, that is to say in the direction of the z coordinate axis. As a result of the cooling module 1 pivoting, the projection 29 on the bearing pin 25 has also moved into the hole 61 in the assembly support 33. The cooling module 1 is secured in the upper outer edge regions by means of the clip connections 21, 23.

It is also to be noted that the cooling module 1 can be detachably fixed to the assembly support 33 in only two assembly steps, without additional attachment means, for example screws, or without using tools. As a result, the cooling module 1 can be quickly mounted on the assembly support 33.

The cooling module 1 which is attached to the assembly support 33 is released in the inverse order, that is to say firstly the clipped connections to the connecting points 13 and 15 must be released and the cooling module 1 must then be pivoted back to such an extent that the corresponding faces 43, 43' are no longer located in a position opposite the stops 41, 41', and the projection 29 on the bearing pin 25 also no longer engages in the hole 61. The cooling module 1 can then be removed from the pivot bearings 17, 19.

From the statements relating to FIGS. 4A to 4C it becomes readily clear that the insertion movement for inserting the cooling module 1 into the pivot bearings 17, 19 occurs essentially transversely with respect to the direction of travel of the vehicle, which extends in the x direction according to the coordinate system shown in FIG. 4A. As a result of the fact that the pivoting movement in the pivot bearings 17, 19 for displacing the cooling module 1 into its end position takes place in the direction of travel of the vehicle, it is possible to ensure that the clip connections 21, 23 are acted on exclusively only by positive acceleration forces from the vehicle.

In a preferred embodiment there is provision that the parts or regions which bear against one another at all the connecting points between the assembly support 33 and the cooling module 1 are composed of a material which has a certain damping property and/or elasticity so that, when driving, vibrations which possibly occur and forces which act on the cooling module do not give rise to an undesired generation of noise. The pivot bearings 17, 19, that is to say their bearing shells and bearing pins, are preferably composed of plastic, or are at least covered with plastic. The same applies to the clip connections 21, 23.

The number of connecting points between the assembly support 33 and the cooling module 1 is not restricted to four. It is also readily possible to provide more than four connecting points, for example six connecting points, or even fewer than four connecting points, for example two connecting points. In one advantageous embodiment which is not illustrated in the figures, four clip connections, which are preferably embodied as movable bearings, are provided above the pivot bearings 17, 19, of which clip connections in each case two are arranged on a side edge region of the cooling module 1, preferably on the side boxes 5, 7. Given a corresponding arrangement and configuration it may also be sufficient for only one of the connecting points to be embodied as a pivot bearing, it being also possible to select the arrangement of the at least one pivot bearing in such a way that its pivot axis does not extend in the y direction, as in the exemplary embodiments described with reference to the preceding figures, but rather in the direction of the z coordinate axis. It is also readily possible for the at least one pivot bearing to be arranged above the at least one clip connection, viewed in the vertical direction. However, all the exemplary embodiments have in common the fact that the insertion movement occurs essentially transversely with respect to the direction of the vehicle, that is to say in the direction of the y or z coordinate axis, while the pivoting movement occurs essentially in the direction of the x coordinate axis, that is to say in the direction of travel of the vehicle, or counter to it.

It is also to be noted that the configuration of the clip connections 21, 23 and of the pivot bearings 17, 19 can also readily be such that, for example, the securing elements 45, 47 and 45', 47', respectively, are not connected to the cooling module 1 but instead to the assembly support 33, while the hole 51 or 51' in which the securing elements 45, 47 and 45', 47', respectively, engage is accordingly provided on the cooling module 1. It is thus also, for example, possible that the bearing pins for the pivot bearings are not located on the cooling module 1 but instead the bearing shell is, while the bearing pins are then accordingly arranged on the assembly support 33. In a first assembly step, the cooling module 1 is therefore inserted into the respective pivot bearing in such a way that the bearing shells are fitted onto the bearing pins which are provided on the assembly support 33. For this purpose, the bearing shells must be open in the downward direction so that they engage around the bearing pins from above. Further embodiment variants are possible.

Figure 5A:
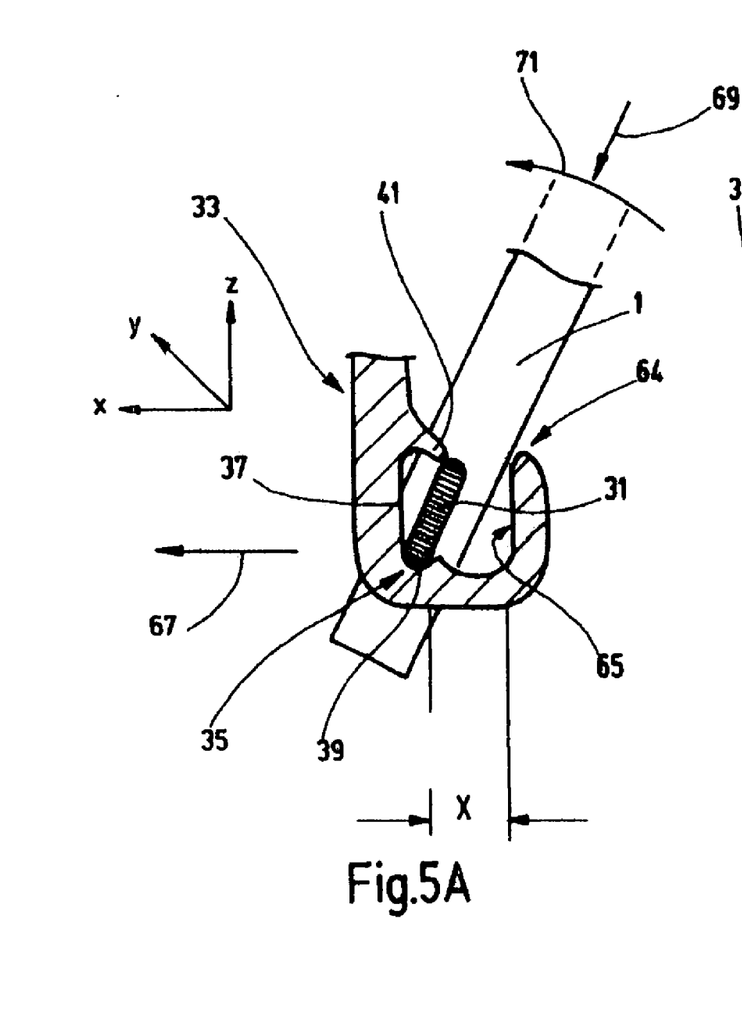
FIGS. 5A to 5C each show a view of a connecting pipe between the assembly support and cooling module, the cooling module being represented in various positions.

FIG. 5A shows a further exemplary embodiment of a pivot bearing for a cooling module 1 which is described with reference to FIGS. 1 to 4C, or is similar. The pivot bearing 19 which is described above could readily also be embodied in the same way as the pivot bearing 64 from FIG. 5A, whose design is explained in more detail below. The pivot bearing 64 is also located in a side edge region of the cooling module 1 and has a bearing shell 35 with a vertically extending straight wall section 37 and a second wall section 39 which adjoins the end of said straight wall section 37 and has a curvature which is adapted to the outer contour of the bearing pin 31, the bearing shell 35 being attached to the assembly support 33 by encapsulation by injection molding. Above the bearing shell 35 there is a radial movement limiter stop 41 which is attached to the assembly support 33 by encapsulation by injection molding and interacts directly with the bearing pin 31. The bearing shell 35 and the radial movement limiter stop 41 are regions of a C-section which is open in the direction counter to the direction of travel 67. The pivot bearing 64 also has a travel limiter stop 65 which is arranged at a distance X from the bearing shell 35 (in the direction counter to the direction of travel 67), said stop 65 being attached to the bearing shell 35 by encapsulation by injection molding, and more details of its function will be given.

Figures 5B, 5C:
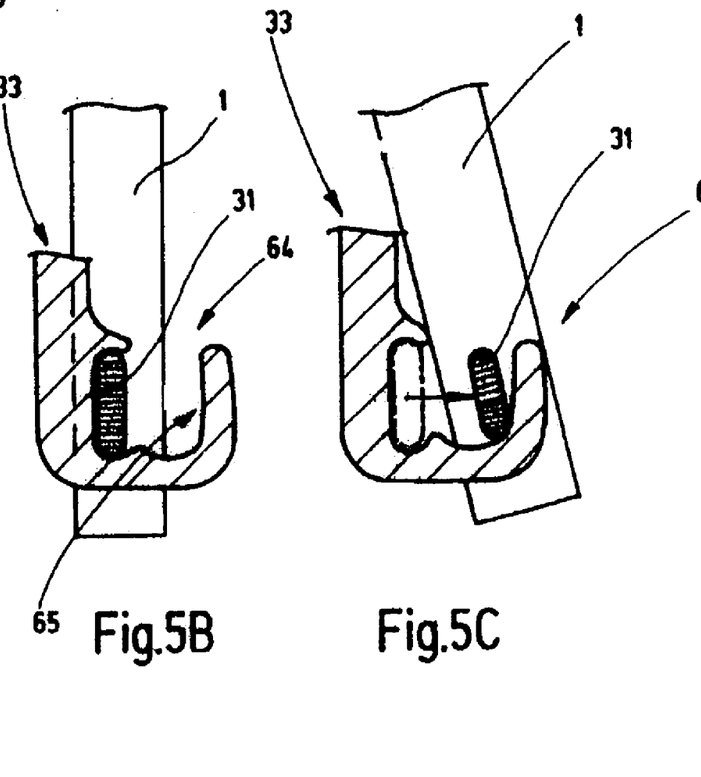

On the side edge region of the cooling module 1 lying opposite the pivot bearing 64 there is a pivot bearing, not shown in FIGS. 5A to 5C, which is developed in the same way as the pivot bearing 64. As in the case of the pivot bearings 17 and 19 in FIGS. 3A and 3B, the pivot bearings 64 of the FIGS. 5A to 5C can also be formed as fixed bearings and movable bearings by suitable means.

The illustration according to FIG. 5A shows the cooling module 1 in a position relative to the assembly support 33 after the first assembly step has already been terminated. The bearing pin 31 is therefore already inserted into the pivot bearing 64, that is to the bearing shell 35, as a result of an insertion movement (indicated by an arrow 69), which occurs essentially transversely with respect to the direction of travel 67 of the vehicle and takes place from above obliquely in a downward direction.

In a second assembly step, the cooling module 1 is then pivoted in the direction of travel 67, by means of a pivoting movement indicated by an arrow 71, in the pivot bearing 64 into an end position (illustrated in FIG. 5B). In this end position, the cooling module 1 is clipped to the assembly support 33 at its at least one connecting point (not illustrated) which is embodied as a clip connection. So that the bearing pin 31 can move into a position opposite the radial movement limiter stop 41, the stop 41 and/or the bearing pin 31 is manufactured from an elastic material, or has an elastic cover so that, when the cooling module 1 pivots, the bearing pin 31 is compressed, and/or the stop 41 is deflected, to such an extent that the bearing pin 31 engages in the C-section.

The pivot bearing 64 and the pivot bearing which is arranged on the opposite side region of the cooling module 1 (not illustrated in FIGS. 5A to 5C) are embodied in such a way that, under the customary operating loads, the connection between the cooling module 1 and the assembly support 33 holds reliably in the region of the pivot bearing, that is to say the bearing pins 31 are reliably secured in the respective bearing shell 35. If forces act on the cooling module 1 which are greater than the operational customary forces, for example owing to a head-on impact of the vehicle in the low-speed range, that is to say at a low speed, the bearing pins 31 are pressed out of the bearing shells 35 in the direction counter to the direction of travel 67 owing to deformation forces acting on the components and/or as a result of acceleration forces. In the process, the bearing pins 31 are displaced to the right to such an extent (in the direction counter to the direction of travel 67) that they impact against the travel limiter stop 65 which is respectively assigned, that is to say said bearing pins 31 are stopped by it, as illustrated in FIG. 5C. As a result, a defined displacement distance (distance x) of the bearing pin 31 is ensured in the case of a collision of the vehicle (crash).

Since the bearing pins 31 can be forced out of the bearing shells 35 (elastic widening of the C-section), the lower region of the cooling module 1 moves away, as a result of which it is in an oblique position, as represented in FIG. 5C. This moving away movement of the cooling module 1 prevents the cooling module 1 from being damaged. The pivot bearings 64, are disengaged in the process but the at least one clip connection, arranged above the respective pivot bearing 64, is not disengaged, the cooling module 1 being still secured to the assembly support 33 at said clip connection.

The assembly support which is described with reference to FIGS. 5A to 5C with the cooling module 1 which is detachably fixed therein also ensures that all the forces arising from negative acceleration are reliably absorbed without damage to the assembly support 33.

The invention claimed is:

1. An assembly support of a front end of a motor vehicle, having at least one cooling module which is detachably fixed to the assembly support, by at least two connecting points, comprising:
    a first connecting point embodied as a pivot bearing; and
    a second connecting point embodied as a clip connection,
        wherein the assembly support is manufactured in a hybrid design comprising a metal core which is encapsulated by injection molding with plastic.

2. An assembly support of a front end of a motor vehicle, having at least one cooling module which is detachably fixed to the assembly support, by at least two connecting points, comprising:
    a first connecting point embodied as a pivot bearing;
    a second connecting point embodied as a clip connection; and
    a radial movement limiter stop for securing the cooling module, which has been pivoted into an end position, against movement in a perpendicular direction with respect to a direction of travel of the motor vehicle.

3. The assembly support as claimed in claim 2, wherein the pivot bearing comprises a bearing shell for accommodating a bearing pin, wherein the bearing shell engages at least partially around the bearing pin.

4. The assembly support as claimed in claim 3, wherein the bearing shell has a plug-in opening into which the bearing pin can be introduced into the bearing shell perpendicularly or essentially perpendicularly with respect to the pivot axis.

5. The assembly support as claimed in claim 2, wherein the clip connection comprises at least one securing element which can be deflected automatically in a resilient fashion, and which, in an attachment position, assumes a position in which the at least one securing element engages behind a corresponding element.

6. The assembly support as claimed in claim 5, wherein the securing element is arranged on the cooling module and, in the attachment position, engages in a hole which is provided on the assembly support.

7. The assembly support as claimed in claim 5, wherein the securing element is arranged on a side box of the cooling module.

8. The assembly support as claimed in claim 5, wherein the securing element is composed of plastic and is manufactured using injection molding.

9. The assembly support as claimed in claim 5, wherein the securing element is integrally connected to at least one side box of the cooling module.

10. The assembly support as claimed in claim 5, wherein the clip connection has a deflection limiter for the deflectable securing element.

11. The assembly support as claimed in claim 2, wherein the connecting points are arranged on opposite sides of the cooling module.

12. The assembly support as claimed in claim 2, wherein the first connecting point is embodied as a fixed bearing, and the second connecting point is embodied as a movable bearing.

13. The assembly support as claimed in claim 2, wherein the pivot bearing, the clip connection, or any combination thereof is arranged in a side edge region of the cooling module.

14. The assembly support as claimed in claim 2, wherein the clip connection is arranged above the pivot bearing as viewed in a direction of an action of gravity.

15. The assembly support as claimed in claim 2, wherein at least four connecting points are provided, wherein at least one of the connecting points is embodied as a fixed bearing and the other connecting points are embodied as movable bearings, wherein the pivot bearing is the fixed bearing and at least some of the movable bearings are embodied as clip connections.

16. The assembly support as claimed in claim 2, further comprising a second pivot bearing embodied as a movable bearing and which is arranged on a side of the cooling module which is opposite the first connecting point.

17. The assembly support as claimed in claim 16, wherein at least one clip connection is arranged above the pivot bearings, on the respective same side of the cooling module as the pivot bearings.

18. The assembly support as claimed in claim 2, wherein the cooling module is attached to the assembly support without screws.

19. An assembly support of a front end of a motor vehicle, having at least one cooling module which is detachably fixed to the assembly support, by at least two connecting points, comprising:
   a first connecting point embodied as a pivot bearing; and
   a second connecting point embodied as a clip connection,
   wherein the pivot bearing comprises a bearing shell for accommodating a bearing pin, wherein the bearing shell at least partially engages around the bearing pin, and
   wherein the pivot bearing is embodied as a latching bearing which accommodates the bearing pin in a latching fashion and releases the bearing pin again by disengaging when a force is applied that exceeds a specific value and acts counter to a direction of travel.

20. The assembly support as claimed in claim 19, wherein the latching bearing is a C-section.

21. The assembly support as claimed in claim 19, further comprising a travel limiter stop, wherein viewed in a direction opposite to a direction of travel, the travel limiter stop adjoins the latching bearing at a distance which the disengaged bearing pin absorbs in a securing position.

22. The assembly support as claimed in claim 21, wherein the travel limiter stop has a supporting web which extends essentially horizontally and adjoins the bearing shell and is adjoined by an essentially vertically extending stop web.

23. The assembly support as claimed in claim 19, wherein the bearing shell has a plug-in opening into which the bearing pin can be introduced into the bearing shell perpendicularly or essentially perpendicularly with respect to the pivot axis.

24. The assembly support as claimed in claim 19, wherein the clip connection comprises at least one securing element which can be deflected automatically in a resilient fashion, and which, in an attachment position, assumes a position in which the at least one securing element engages behind a corresponding element.

25. The assembly support as claimed in claim 24, wherein the securing element is arranged on the cooling module and, in the attachment position, engages in a hole which is provided on the assembly support.

26. The assembly support as claimed in claim 24, wherein the securing element is arranged on a side box of the cooling module.

27. The assembly support as claimed in claim 24, wherein the securing element is composed of plastic and is manufactured using injection molding.

28. The assembly support as claimed in claim 24, wherein the securing element is integrally connected to at least one side box of the cooling module.

29. The assembly support as claimed in claim 24, wherein the clip connection has a deflection limiter for the deflectable securing element.

30. The assembly support as claimed in claim 19, wherein the connecting points are arranged on opposite sides of the cooling module.

31. The assembly support as claimed in claim 19, wherein the first connecting point is embodied as a fixed bearing, and the second connecting point is embodied as a movable bearing.

32. The assembly support as claimed in claim 19, wherein the pivot bearing, the clip connection, or any combination thereof is arranged in a side edge region of the cooling module.

33. The assembly support as claimed in claim 19, wherein the clip connection is arranged above the pivot bearing as viewed in a direction of an action of gravity.

34. The assembly support as claimed in claim 19, wherein at least four connecting points are provided, wherein at least one of the connecting points is embodied as a fixed bearing and the other connecting points are embodied as movable bearings, wherein the pivot bearing is the fixed bearing and at least some of the movable bearings are embodied as clip connections.

35. The assembly support as claimed in claim 19, further comprising a second pivot bearing embodied as a movable bearing and which is arranged on a side of the cooling module which is opposite the first connecting point.

36. The assembly support as claimed in claim 35, wherein at least one clip connection is arranged above the pivot bearings, on the respective same side of the cooling module as the pivot bearings.

37. The assembly support as claimed in claim 19, wherein the cooling module is attached to the assembly support without screws.

* * * * *